Figure 1:
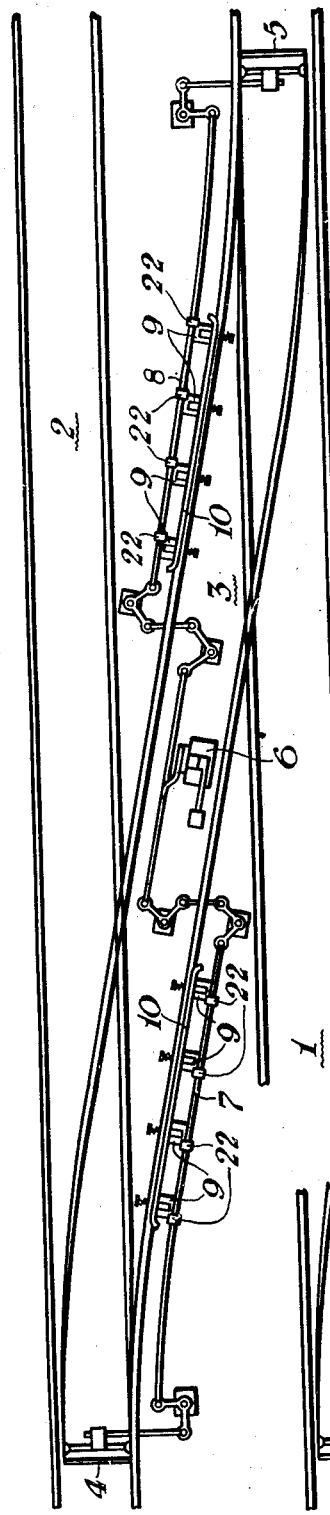

Sept. 20, 1949.  W. R. GRACEY, JR  2,482,267
DETECTOR BAR SWITCH LOCK

Filed Feb. 12, 1948  2 Sheets-Sheet 1

INVENTOR.
William R. Gracey Jr.
BY
HIS ATTORNEY

Sept. 20, 1949.  W. R. GRACEY, JR  2,482,267
DETECTOR BAR SWITCH LOCK
Filed Feb. 12, 1948  2 Sheets-Sheet 2

INVENTOR.
William R. Gracey Jr.
BY
HIS ATTORNEY

Patented Sept. 20, 1949

2,482,267

UNITED STATES PATENT OFFICE 2,482,267

DETECTOR BAR SWITCH LOCK

William R. Gracey, Jr., Swissvale, Pa., assignor to The Union Switch & Signal Company, Swissvale, Pa., a corporation of Pennsylvania Application February 12, 1948, Serial No. 7,737

3 Claims. (Cl. 246—151)

My invention relates to railway switch operating apparatus, and particularly to apparatus including means for locking a switch against movement when the track adjacent the switch is occupied by a car or other vehicle.

In connection with railway crossovers between main tracks and with pull-out tracks leading from main tracks into sidings, it is sometimes desirable to prevent operation of a switch while the adjacent crossover or pull-out track is occupied by a vehicle. Such protection of a switch guards against two types of accidents.

One type is the fouling accident, where a car is left standing on the pull-out or crossover track so close to the main track as to foul a passing train. If operation of the switch is prevented while a car is standing in the pull-out or crossover track within fouling distance of the main line, then a train or car entering the pull-out or crossover must clear the main line completely before the switch may be thrown behind it to permit passage of a train on the main line.

The other type of accident is the switch-splitting which occurs when a switch is inadvertently thrown between trucks of a car. If the switch cannot be thrown while a car is in it, then this type of accident cannot occur.

It is therefore an object of the present invention to provide improved apparatus for mechanically locking a railway track switch actuating mechanism whenever the track is occupied.

Another object is to provide an improved switch locking mechanism including a detector bar biased to a wheel engaging position, and a lock operated by movement of the detector bar upon engagement by a wheel to lock a pipe line forming a part of the switch controlling mechanism.

I accomplish these objects by utilizing a switch controlling mechanism of conventional type, including a switch controlling device connected to the switch by a longitudinally shiftable pipe line extending generally parallel to the track rails. I mount a detector bar adjacent each of the rails to be protected. The detector bar is supported at spaced intervals on pivoted arms located between the rail and the pipe line. Each support includes a latch member which at times cooperates with a locking collar on the pipe line to prevent longitudinal shifting of the pipe line and hence to prevent operation of the switch. Each arm is spring biased to a normal position in which the detector bar may be engaged by a wheel and the latch member is free of the locking collar on the pipe line. When the track is occupied by a vehicle, the wheel of the vehicle engages the detector bar, moving it with its associated supporting arms and their latching members, to a position in which the latching members prevent movement of the pipe line.

Other objects and characteristic features of my invention will become apparent as the description proceeds.

I shall describe two forms of apparatus embodying my invention, and shall then point out the novel features thereof in claims.

Figure 1A:
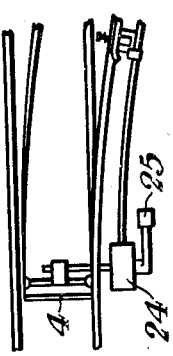
Figure 3:
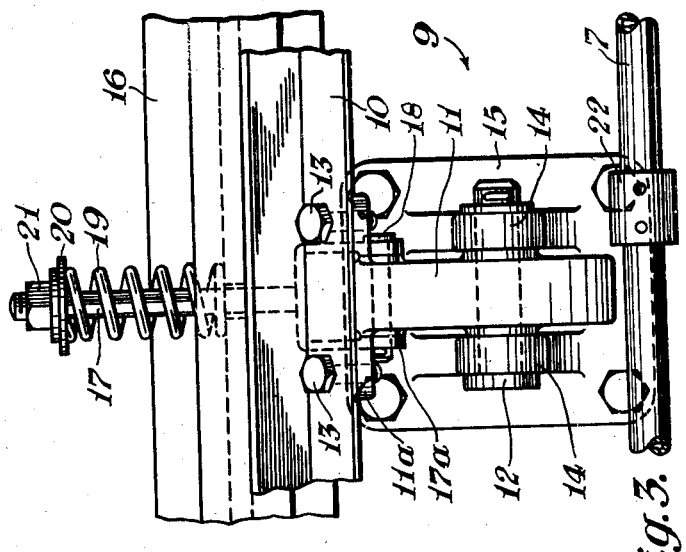
Figure 2:
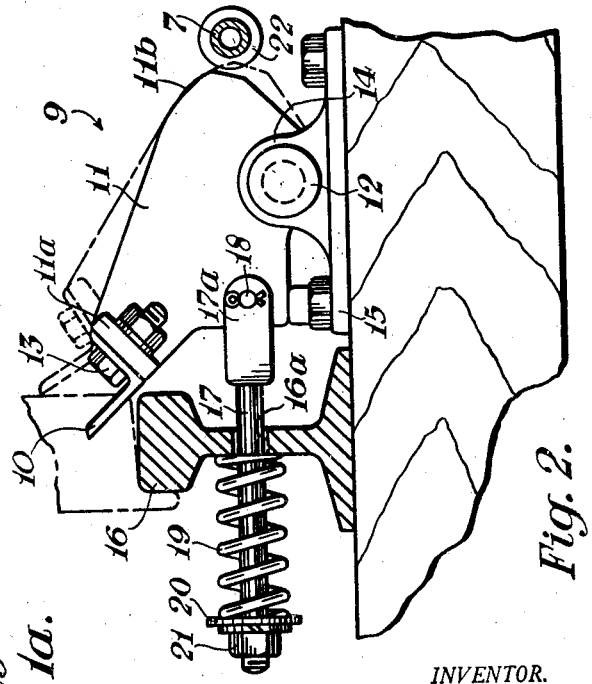
Figure 4:
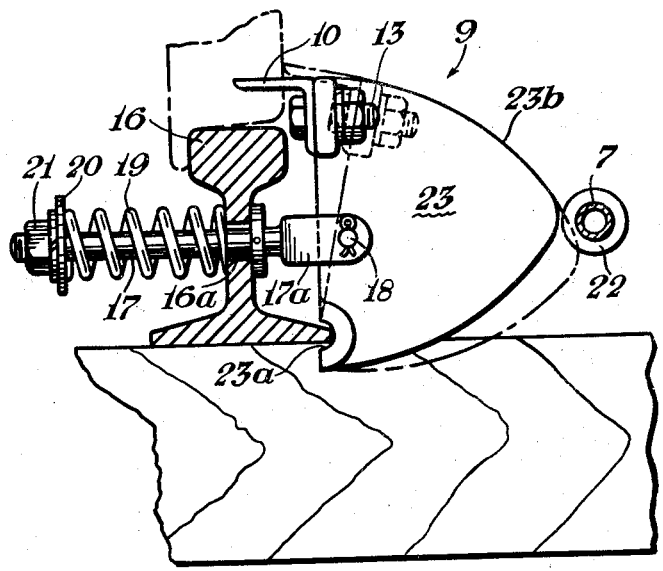
Figure 5:
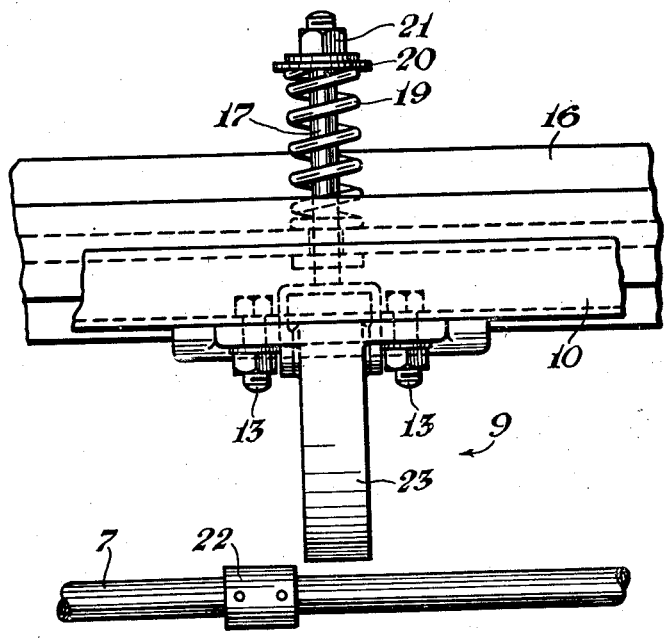

In the accompanying drawings, Fig. 1 is a somewhat diagrammatic layout of a railway crossover equipped with protective apparatus embodying my invention. Fig. 1a is a similar, but fragmentary layout of a different type of crossover switch operating mechanism with which my invention may be used. Fig. 2 is an elevational view of one form of locking device embodying my invention. Fig. 3 is a plan view of the device shown in Fig. 2. Fig. 4 is an elevational view of an alternative form of locking device. Fig. 5 is a plan view of the device shown in Fig. 4.

Referring now to the drawings, there are shown in Fig. 1 two stretches of parallel railway track 1 and 2 connected by a crossover 3. Switches 4 and 5 connect the opposite ends of the crossover 3 to the parallel tracks. The two switches are operable by means of a center-throw switch stand 6 connected to the switches 4 and 5 through conventional linkages including pipe lines 7 and 8.

There is shown in Fig. 1a a modified form of crossover switch control apparatus with which my invention may be used. Fig. 1a shows the switch 4 at one end of a crossover similar to the crossover 3 of Fig. 1. This switch and the switch at the opposite end of the crossover (not shown) are moved by manually operable switch machines 24. Each switch machine 24 has a hand-throw lever 25 for operating the switch between normal and reverse positions. The switch machines 24 are of the type shown in Letters Patent of the United States No. 2,184,870, granted to Herbert L. Bone and Kenneth J. J. McGowan on December 26, 1939. Such machines have a locking mechanism controllable from an external point by a mechanical connection such as the pipe lines 7 and 8. In the present arrangement, the locking mechanisms of the switch machines 24 must be released by operation of the center-throw lever 6 before the hand-throw levers 25 can be operated to throw their associated switches. Each of the pipe lines 7 and 8 are adapted to be locked by a plurality of locking devices 9, which are actuated by detector bars or treadles 10. Each of the locking devices 9 shown in Fig. 1 may take either the form shown in Figs. 2 and 3 or the form shown in Figs. 4 and 5. The lengths of the detector bars 10 of Figs. 1 and 1a are chosen for purposes of illustration only. The ends of the bars nearest the switch points may, if desired, be extended as close to the switch points as possible. The opposite ends of the bars may also be extended to reduce or eliminate the gap at the center of the crossover. These extensions of the bars may or may not be provided with additional locking devices 9.

Figs. 2 and 3

Detector bar 10 of Figs. 2 and 3 is supported by an arm 11 pivotally mounted on a pin 12. The arm 11 takes the form of a generally flat plate having flanges 11a to receive bolts 13 by which the detector bar is attached to the arm. The pin 12 passes through a suitable aperture in arm 11 and also through a pair of bearings 14 formed on a mounting plate 15 attached to the ties of the trackway in any suitable manner, so that the arm 11 extends generally at right angles to the rail 16. The web of the rail is provided with an aperture 16a. A rod 17 extends through this aperture, and is provided on its outer end with a yoke 17a, which spans the arm 11 and is pivotally connected thereto by means of a pin 18. A spring 19 is retained between the web of rail 16 and a retaining washer 20 held on the rod 17 by means of a nut 21.

The pipe line 7 passes adjacent to the arm 11 and carries a locking sleeve 22. The arm 11 is provided with an arcuate surface 11b, radial with respect to the pivot pin 12. When the wheel of a vehicle moves over the track 16, it engages the detector bar 10, and moves it to the right, as shown in dotted lines in Fig. 2, thereby pivoting the arm 11 in a clockwise direction, so that the portion 11b of arm 11 moves into the path of the locking sleeve 22. As long as arm 11 lies in the path of sleeve 22, the pipe line 7 cannot be moved longitudinally.

Figs. 4 and 5

The structure shown in Figs. 4 and 5 is generally similar to that of Figs. 2 and 3, and similar parts have been given the same reference numerals in all the figures. The chief difference between Figs. 4 and 5 and Figs. 2 and 3 lies in the construction of the arm 23 which takes the place of the arm 11 of Figs. 2 and 3.

The arm 23 is in the form of a generally flat plate. Near the lower edge of its face adjacent the rail, it is provided with a semi-cylindrical recess 23a, which is adapted to engage the edge of the rail flange, so that the arm 23 pivots about that point of engagement. This eliminates the need of special supporting structures such as the bearings 14 and mounting plate 15 of Figs. 2 and 3.

The arm 23 is also provided with an arcuate surface portion 23b, which is substantially radial with respect to the pivot point of the arm. This arcuate surface 23b is extended so that it is substantially longer than the arcuate surface 11b of Fig. 2. This permits the arcuate portion 23b to remain in locking engagement with the sleeve 22 throughout a greater angular motion of the plate 23 about its pivot point than was possible in the case of the plate 11 of Fig. 2. This construction prevents damage to the parts of the mechanism by the passage through the detector bar of a vehicle having an extremely wide wheel, such as a locomotive with a blind driver. It should be noted that the pivot construction shown in Figs. 4 and 5 cooperates in permitting this additional rotation of the arm 23. By the use of this pivot structure, the arm 23 may be mounted against the rails between ties, so that when it is deflected to extreme positions, its lower edge may move down between the ties.

The position of locking sleeve 22 with respect to the arm 23 in Fig. 5 is reversed from the corresponding position of sleeve 22 with respect to arm 11 in Fig. 3. The position shown in one figure represents the normal switch position, while that in the other figure represents the reversed position of the switch. It may therefore be seen that my improved locking mechanism prevents movement of the switch in either direction whenever the track is occupied by a vehicle.

Although I have herein shown and described only two forms of railway switch operating apparatus embodying my invention, it is understood that various changes and modifications may be made therein within the scope of the appended claims without departing from the spirit and scope of my invention.

Having thus described my invention, what I claim is:

1. Railway switch operating apparatus including a track switch, a switch controlling device, a shiftable member extending generally parallel to a track rail adjacent the switch and connected to the switch controlling device for concurrent movement therewith, an abutment on the shiftable member extending toward the rail, an arm mounted for pivotal movement about an axis parallel to the rail and located between the track rail and the shiftable member adjacent said abutment, a wheel engaging member supported by the arm, said arm having an arcuate peripheral portion concentric with said axis and having a radius less than the distance between the axis and the shiftable member but greater than the distance between the axis and the abutment, and means biasing the arm to a position in which the wheel engaging member lies in the path of a vehicle wheel moving along the rail and said peripheral portion of the arm is out of the path of said abutment, said arm being rotated about its pivot upon engagement of said wheel engaging member by a vehicle wheel so as to move said peripheral portion into the path of said abutment and thereby lock the shiftable member and the switch controlling device.

2. Railway switch operating apparatus including a track switch, a switch controlling device, a shiftable member extending generally parallel to a track rail adjacent the switch and connected to the switch controlling device for concurrent movement therewith, an abutment on the shiftable member extending toward the rail, an arm mounted for pivotal movement about an axis parallel to the rail and located between the track rail and the shiftable member adjacent said abutment, a wheel engaging member supported by the arm and movable laterally with the arm upon engagement by a wheel, said arm having an arcuate peripheral portion concentric with said axis and having a radius less than the distance between the axis and the shiftable member but greater than the distance between the axis and the abutment, and means biasing the arm to a position in which the wheel engaging member lies in the path of a vehicle wheel moving along the rail and said peripheral portion of the arm is out of the path of said abutment, said arm being rotated about its pivot upon engagement of said wheel engaging member by a vehicle wheel so as to move said peripheral portion into the path of said abutment and thereby lock the shiftable member and the switch controlling device, said arcuate peripheral portion extending far enough to provide locking of the shiftable member during overtravel of the arm caused by the passage of a vehicle with wide wheels.

3. Railway switch operating apparatus including a track switch, a switch controlling device, a shiftable member extending generally parallel to a track rail adjacent the switch and connected to the switch controlling device for concurrent movement therewith, an abutment on the shiftable member extending toward the rail, an arm located between the track rail and the shiftable member adjacent said abutment, said arm having a semicylindrical recess adjacent its lower end on the side nearest the rail, said recess being adapted to receive the rail flange so that the arm may pivot on the rail flange, a wheel engaging member supported by the arm, said arm having an arcuate peripheral portion having its center of curvature substantially at the rail flange and a radius less than the distance between the rail flange and the shiftable member but greater than the distance between the rail flange and the abutment, and means biasing the arm to a position in which the wheel engaging member lies in the path of a vehicle wheel moving along the rail and said peripheral portion of the arm is out of the path of said abutment, said arm being rotated about the rail flange upon engagement of said wheel engaging member by a vehicle wheel so as to move said peripheral portion into the path of said abutment and thereby lock the shiftable member and the switch controlling device.

WILLIAM R. GRACEY, Jr.

REFERENCES CITED

The following references are of record in the file of this patent:

UNITED STATES PATENTS

| Number | Name | Date |
| --- | --- | --- |
| 352,780 | Reiff | Nov. 16, 1886 |
| 374,915 | Turner | Dec. 13, 1887 |
| 552,093 | Bezer et al. | Dec. 31, 1895 |
| 847,089 | Madeley | Mar. 12, 1907 |
| 2,027,702 | Renshaw | Jan. 14, 1936 |

FOREIGN PATENTS

| Number | Country | Date |
| --- | --- | --- |
| 33,025 | Germany | Sept. 24, 1885 |
| 61,212 | Germany | Feb. 19, 1892 |
| 581,972 | France | Dec. 9, 1924 |